(12) United States Patent
Weisberg et al.

(10) Patent No.: US 8,217,869 B2
(45) Date of Patent: Jul. 10, 2012

(54) FLEXIBLE DISPLAY SYSTEM

(75) Inventors: Michael C. Weisberg, Woodside, CA (US); Michael B. Heaney, Palo Alto, CA (US); John Dunec, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1749 days.

(21) Appl. No.: 11/017,327

(22) Filed: Dec. 20, 2004

(65) Prior Publication Data

US 2006/0132427 A1    Jun. 22, 2006

(51) Int. Cl.
*G09G 3/34* (2006.01)

(52) U.S. Cl. .............................. 345/84; 345/105; 345/107

(58) Field of Classification Search .................. 345/105, 345/107, 84
See application file for complete search history.

(56) References Cited

U.S. PATENT DOCUMENTS

| | | | |
|---|---|---|---|
| 4,126,854 A | 11/1978 | Sheridon | |
| 4,655,897 A | 4/1987 | DiSanto et al. | |
| 4,732,830 A | 3/1988 | DiSanto et al. | |
| 4,742,345 A | 5/1988 | DiSanto et al. | |
| 5,041,824 A | 8/1991 | DiSanto et al. | |
| 5,053,763 A | 10/1991 | DiSanto et al. | |
| 5,077,157 A | 12/1991 | DiSanto et al. | |
| 5,276,438 A | 1/1994 | DiSanto et al. | |
| 5,389,945 A | 2/1995 | Sheridon | |
| 6,222,513 B1 | 4/2001 | Howard et al. | |
| 6,844,058 B2 * | 1/2005 | Blum et al. | 428/343 |
| 2005/0137542 A1 * | 6/2005 | Underhill et al. | 604/361 |

* cited by examiner

*Primary Examiner* — Nitin Patel
*Assistant Examiner* — Leonid Shapiro
(74) *Attorney, Agent, or Firm* — Fay Sharpe LLP

(57) ABSTRACT

The present exemplary embodiment relates to an improved flexible display system. One form of the display may use various types of switchable materials contained in micro cells formed from a fabric or mesh material. These cells may serve as a spacer between two opposing electrode sheets and may be individually sealed to the electrode sheets on each face. Moreover, the fabric may, in some forms, be implemented as an electrical grid for addressing the micro cells.

20 Claims, 4 Drawing Sheets

FLEXIBLE DISPLAY SYSTEM

BACKGROUND

The present exemplary embodiment relates to an improved flexible display system. One form of the display may use various types of switchable materials contained in micro-cells formed from a fabric or mesh material. These cells may serve as a spacer between two opposing electrode sheets and may be individually sealed to the electrode sheets on each face. Moreover, the fabric may, in some forms, be implemented as an electrical grid for addressing the micro-cells.

It finds particular application in conjunction with a flexible display medium such as electric paper and the like, and will be described with particular reference thereto. However, it is to be appreciated that the present exemplary embodiment is also amenable to other applications where flexible displays may be used such as in phones, personal digital assistants (PDAs), computer monitors, signage, billboards, . . . etc.

By way of background, there is a need for a low cost, highly flexible electronic display. Flexible displays will be useful in a variety of implementations. Flexible displays typically utilize a medium that can reversibly change appearance upon application of a stimulus and a means to address specific subsections of the medium with the appropriate stimuli, all in a flexible package. For several reasons, it is also generally desirable to microencapsulate the medium.

Electrophoretic displays that use a mesh-like material are known. In this regard, U.S. Pat. No. 5,276,438 teaches the use of a mesh in an electrophoretic display for purposes of color contrast and providing electrical bias. However, the mesh does not function as structure or to define a micro cell area. Moreover, displays of this type do not have the flexibility desired.

One emerging use of more flexible displays resides in electric paper technology. One way to make electric paper possible using traditional electronic display technology is to completely remove the driving electronics from an electronic display package and use external addressing electrodes to write and erase images. This approach both reduces the per unit cost of electric paper sheets and enables the use of cheap, flexible plastic films in place of glass plates for packaging. Multiple electric paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g., 100 micrometers) in diameter that serve as display elements. Each rotating display element has halves of contrasting colors, such as a white half and a black half. Each bichromal rotating element also has an electric dipole moment, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and relatively flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the magnitude and polarity of the electric fields.

To improve performance, more recent embodiments of these sheets advantageously incorporate charge-retaining islands thereon. U.S. Pat. No. 6,222,513 B1, issued Apr. 24, 2001 and entitled "Charge Islands for Electric Paper and Applications Thereof" describes electric paper having these features. Turning now to FIG. 1, an exemplary Gyricon sheet of this type is shown. The Gyricon sheet is comprised of the following elements: a sheet 300, a first encapsulating layer 302 patterned with conductive charge-retaining islands 306, and a second encapsulating layer 304 that may or may not be patterned with charge-retaining islands.

Together, the first encapsulating layer 302 and the second encapsulating layer 304 do the following things: indefinitely contain a sheet 300, provide at least one transparent window through which the sheet 300 can be viewed, and provide at least one external surface patterned with charge retaining islands 306 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, or some other method to hold the contents of the sheet 300.

FIG. 1 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

Referring to FIG. 2, in U.S. application Ser. No. 10/927, 691, filed Aug. 27, 2004, entitled "Disordered Three-Dimensional Percolation Technique for Forming Electric Paper," naming Michael B. Heaney and Gregory P. Schmitz as inventors, an electric paper structure 104 is illustrated having a single layer, or sheet, of relatively disordered particles that heretofore were separated as uniquely formed layers in electric paper structures. In this regard, the single layer includes display elements 106, such as bistable pixel structures and conductive particles 108, both preferably embedded in an insulating matrix of material 110 (e.g., non-conductive particles).The display elements 106 take the exemplary form of microencapsulated bichromal spheres and the conductive particles 108 serve as both conductive islands 114 and as a ground plane 118. The conductive particles 108 form a discontinuous random layer of conductive islands on one side 112 of the sheet, and a continuous electrically conductive percolative network or matrix, or ground plane 118 on the other side of the sheet 116. This is accomplished by varying the effective percolation threshold across the thickness of the sheet 104. That is, particle ratios on one side of the sheet 112 are below the percolation threshold (e.g., forming the conductive islands 114) while the particle ratios on the other side 116 are above the percolation threshold (e.g., forming the ground plane 118).

BRIEF DESCRIPTION

In accordance with one aspect of the present exemplary embodiment, a flexible display apparatus comprises a first flexible encapsulating layer, a second flexible encapsulating layer, a flexible encapsulated layer between the first encapsulating layer and the second encapsulating layer, the encapsulated layer comprising a mesh layer wherein a plurality of micro-cells are defined by the mesh layer, the first encapsulating layer and the second encapsulating layer and a plurality of display elements housed within the plurality of microcells.

In accordance with another aspect of the present exemplary embodiments, the first flexible encapsulating layer is heat sealable.

In accordance with another aspect of the presently described embodiments, the first flexible encapsulating layer comprises multiple layers.

In accordance with another aspect of the presently described embodiments, the second flexible encapsulating layer is heat sealable.

In accordance with another aspect of the presently described embodiments, the second flexible encapsulating layer comprises multiple layers.

In accordance with another aspect of the presently described embodiments, the second flexible encapsulating layer has conductive islands formed thereon.

In accordance with another aspect of the presently described embodiments, the flexible encapsulated layer is heat sealable.

In accordance with another aspect of the presently described embodiments, the flexible encapsulated layer comprises a mesh layer formed of polymer material.

In accordance with another aspect of the presently described embodiments, the flexible encapsulated layer comprises a mesh layer formed of conductive wire.

In accordance with another aspect of the presently described embodiments, the conductive wire is coated with multiple polymer layers.

In accordance with another aspect of the presently described embodiments, the multiple polymer layers have different melting points.

In accordance with another aspect of the presently described embodiments, the micro-cells of the flexible encapsulated layer are individually addressable.

In accordance with another aspect of the presently described embodiments, the flexible display comprises at least one drive circuit and a controller.

In accordance with another aspect of the presently described embodiments, the flexible display comprises a first flexible encapsulating layer, a second flexible encapsulating layer, a flexible encapsulated layer between the first encapsulating layer and the second encapsulating layer, the encapsulated layer comprising a conductive mesh layer wherein a plurality of micro-cells are defined by the conductive mesh layer, the first encapsulating layer and the second encapsulating layer, a plurality of display elements housed within the plurality of microcells and at least one drive circuit connected to the conductive mesh layer and being operative to address selected ones of the plurality of micro-cells.

In accordance with another aspect of the presently described embodiments, the first flexible encapsulating layer is heat sealable.

In accordance with another aspect of the presently described embodiments, the second flexible encapsulating layer is heat sealable.

In accordance with another aspect of the presently described embodiments, the conductive mesh layer is formed of conductive wire.

In accordance with another aspect of the presently described embodiments, the conductive wire is coated with multiple polymer layers.

In accordance with another aspect of the presently described embodiments, the multiple polymer layers have different melting points.

DETAILED DESCRIPTION

The presently described embodiments relate to implementation of flexible displays. Such flexible displays may be used in combination with a printing, or addressing, mechanism that can be used to manipulate display elements housed within the flexible displays to form images and the like for viewing. A printing mechanism that may be used is external to the display and take the form of, for example, a wand-type printer. In one form, however, this technique to form flexible displays may be combined with a technique for addressing the formed display (e.g. micro-cells within the display) without use of an external device to achieve a low cost, highly flexible, digital display media. In this case, suitable controllers and drivers may be implemented to do so.

In an advantageous implementation of the presently described embodiments, a mesh layer is implemented to provide a variety of functions to the display, as will be described in detail below. Briefly, however, it will be understood that the mesh layer that is used provides flexibility to the overall structure. In addition, the mesh layer provides structure. In this regard, a plurality of micro-cells is formed using a combination of the mesh layer and other layers in the assembly. These micro-cells function to house display elements and any necessary fluid (e.g. oil) to facilitate stimulation of the display elements. Still further, the mesh layer may be appropriately colored (e.g. in black) to provide contrast. Last, in at least one advantageous form, the mesh layer may be conductive. In this way, the mesh layer can be used as an electrical grid to address individual micro-cells. Again, this will negate the need for an external addressing device.

Figure 1:
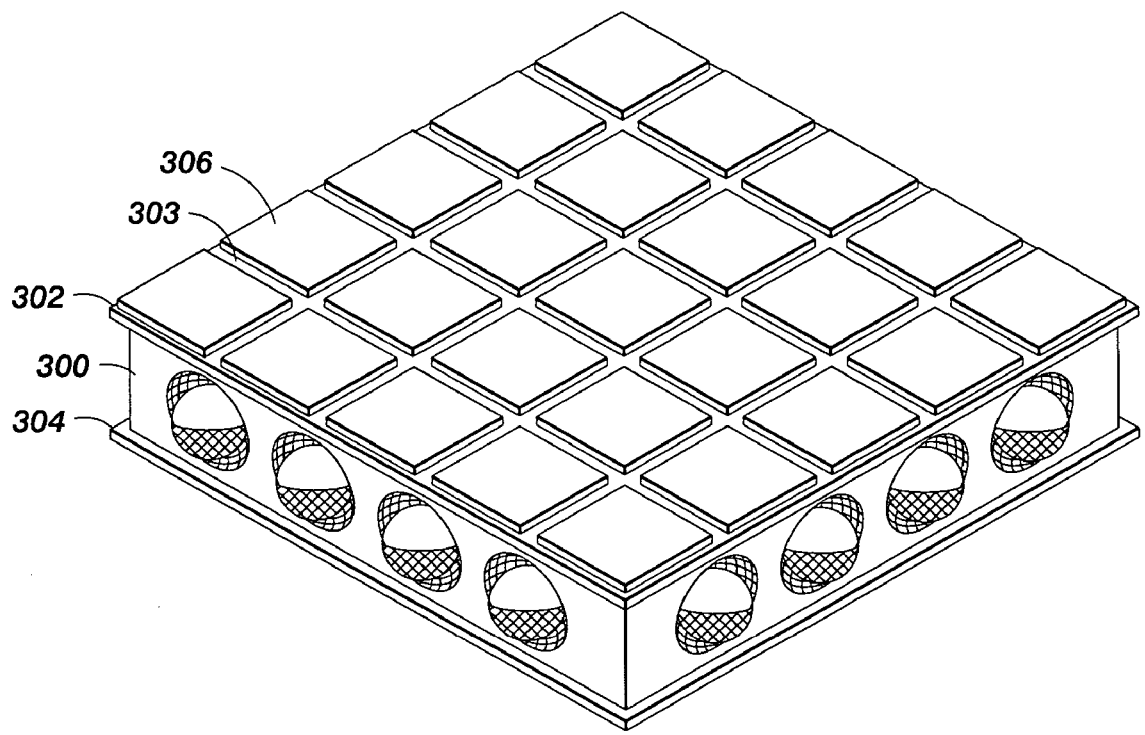
FIG. 1 is an illustration of a known electric paper embodiment.
Figure 2:
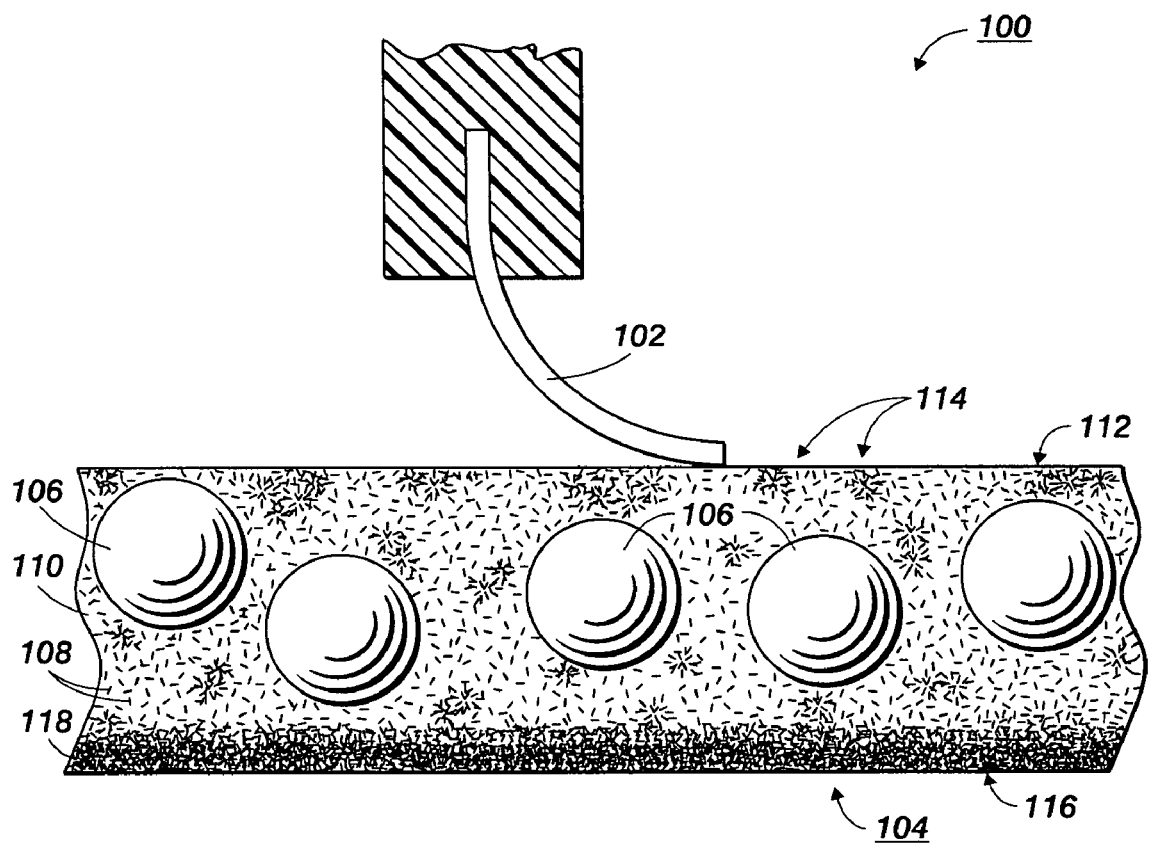
FIG. 2 is an illustration of another known electric paper embodiment.
Figure 3:
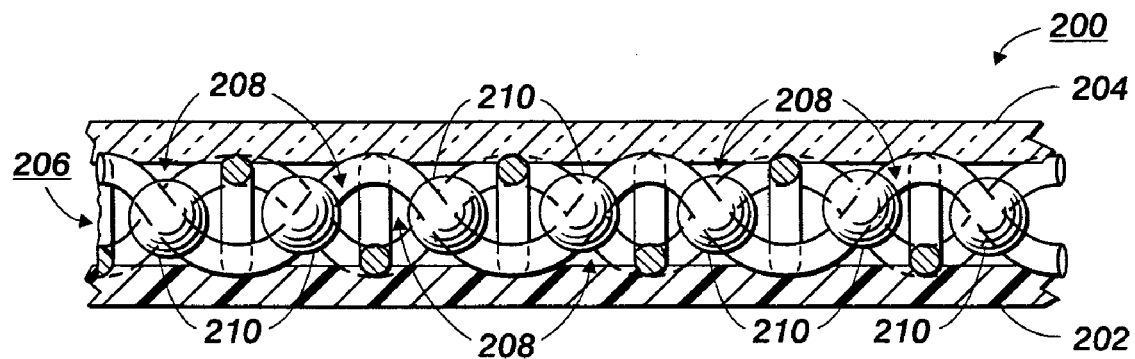
FIG. 3 is an illustration of an embodiment flexible display according to the presently described embodiments.

More particularly, with reference now to FIG. 3, the presently described embodiments implement, for example, a three-layer structure 200. In one form, a first encapsulating layer 202 is a flexible, heat sealable film. A second encapsulating layer 204 may also be made of a flexible, heat sealable film. The second encapsulating layer 204 may, in one form, also serve as a face sheet, or a substantially transparent surface that will allow for display and viewing of images and the like. The encapsulating layers 202 and 204 may take a variety of forms depending on the actual implementation of the contemplated embodiments herein. For example, each of these layers may also be electrically conductive to accommodate the switching functions of the display elements. More detailed examples of a composition and configuration of the first encapsulating layer 202 and a composition and configuration of second encapsulating layer 204 are described hereafter in connection with an example implementation described in FIG. 5.

Figure 4:
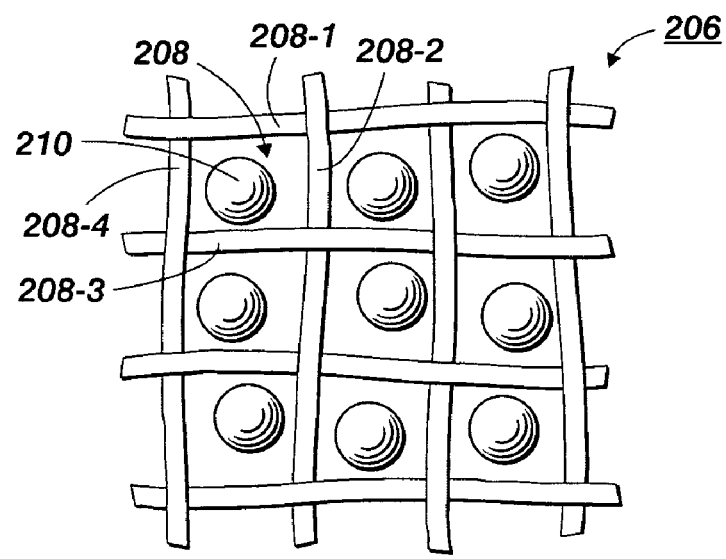
FIG. 4 is an illustration of a mesh layer of the pixel display of FIG. 3 according to the presently described embodiments.

As shown in FIGS. 3 and 4, the middle, or encapsulated, layer 206 is a flexible, micro-mesh material, or a suitable flexible film material, that defines a plurality of basic cavity structures, or micro-cells, such as that shown at 208. In one form, the micro-mesh material may be woven. However, it may also take the form of laser-perforated or micro-die cut material. Each micro-cell, such as micro-cell 208, is defined by selected portions (such as 208-1, 208-2, 208-3, and 208-4) of four intersecting fibers of the micro-mesh material, as shown, and corresponding portions of each of the first encapsulating layer and the second encapsulating layer. In one form, the micro-mesh is woven from a polymer material that is sufficiently conducive to heat sealing techniques but remains sufficiently stable after heat sealing to form the structure for the micro-cells. In this regard, the heat sealing will result in a configuration so that each side (e.g. portion of fiber) of the micro-cell is bonded at all points along an interface between that side and an adjacent encapsulating layer, whether it be the first encapsulating layer or the second encapsulating layer. In another form, each micro-cell may only be partially sealed. In addition, this material (e.g. the micro-mesh material) is, in one form, black in color to enhance contrast for the display.

In the described embodiments, the micro-cells 208 are filled with electrically switchable material, such as display elements 210. The display elements 210 may take a variety of forms. For example, the display elements 210 may be electrophoretic in nature. In one form, the display elements may comprise an electrophoretic particle system using particles of one color and a colored fluid or an electrophoretic two particle system. Alternatively, the display elements may comprise bi-stable pixel elements such as micro-encapsulated bichromal spheres, which are well known in the art. Of course, any electric or magnetic rotating sphere, electrophoretic or magnetophoretic particles, liquid crystal droplets, etc. may be used. The display elements 210 may also be implemented as a plurality of display elements housed within a single micro-cell structure. Moreover, the display elements 210 are shown as having a much larger relative size than may be implemented in many embodiments. For example, where multiple display elements 210 are housed within a single micro-cell structure, the display elements 210 will be of a much smaller diameter, relative to the woven mesh material, than is shown. The size of the display elements may also be dependent upon the technique that is used to address the display elements.

The three layers 202, 204, and 206 are joined, in one form, by heat sealing. Of course, other suitable sealing or bonding techniques may be employed. However, it will be understood that no matter the technique of sealing or bonding, the process will, in many implementations, also involve the sealing of fluid within the micro-cells 208 to accommodate the selected display elements. In this regard, different fluids (such as oil-based materials) may be used for different display elements. These variations will be apparent to those of skill in the art.

In any event, the middle layer 206 is sealed to the encapsulating layers 202 and 204. Under appropriate conditions of heat and pressure, individually sealed cells full of electrically switchable material, and fluid where necessary, will be the result. The individually sealed cells may be completely sealed or only partially sealed, allowing for at least some exchange of material between cells. These appropriate conditions of heat and pressure may vary from application to application and material to material. In one example implementation, however, where heat sealable polyester material is used as the encapsulating layers and conductive wire with heat sealable polymer material is used as the woven material, the heat sealing process requires the application of heat energy of approximately 110 degrees Celsius for approximately 1 second under approximately 20 PSI pressure conditions. The perimeter of the stack of layers could also be heat sealed as a precaution to ensure no loss or contamination of the mixture dispersed in each cell. It should be appreciated that a suitably sealed sheet of material contemplated by the presently described embodiments may be cut to size without any appreciable loss of fluid and/or display elements from the stack of layers because each micro-cell will be individually sealed. The presently described embodiments may also take a form wherein cells along the perimeter of a sheet of the three layer structure are completely sealed but cells in the interior regions of the structure are only partially sealed. This will allow the sheet to be cut to size along the periphery without appreciable loss of material but still not require every cell to be completely sealed.

Figure 5:
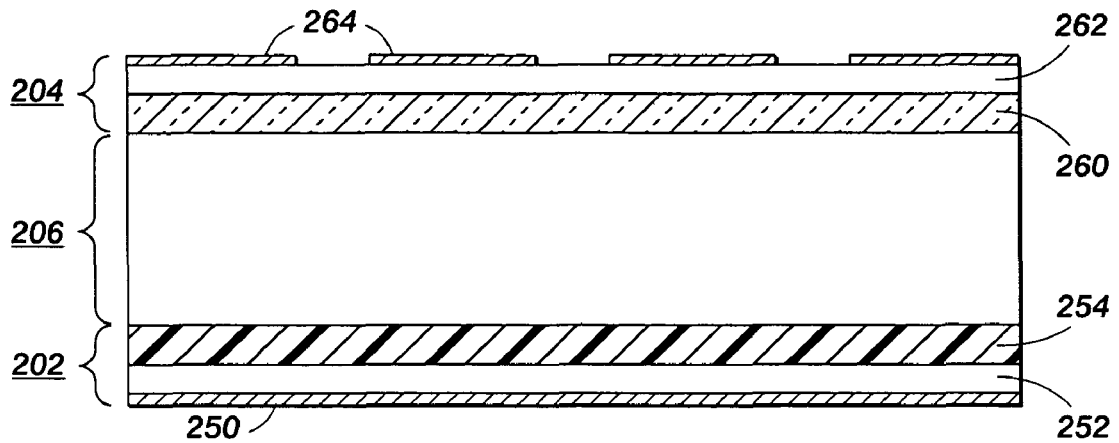
FIG. 5 is an illustration of a flexible display according to the presently described embodiments; and, FIG. 6 is an illustration of a conductive mesh layer of the pixel display of FIG. 3 according to the presently described embodiments.

Referring to FIG. 5, an example of an implementation of the presently described embodiments as an electric paper assembly is illustrated. As shown, the encapsulating first layer 202 may comprise a three ply film. A first ply, or sub-layer, may be formed of a conductive coating 250. The conductive coating 250 may be a metal material or any other conductive material. The middle ply, or sub-layer, may take the form of a low permeability polymer 252. The third ply, or sub-layer, may implement a low melt temperature, thermoplastic layer 254. The thermoplastic layer 254 would, at least in some forms, be used for heat sealing. This first layer 202 may provide one side of an electric field, a low permeability barrier and an adhesive/sealing layer.

The middle layer 206 may take a variety of forms to house the display elements such as a woven micro-mesh, as described above, or an otherwise formed film that would define walls of the micro cells. As described above, the micro-cells would be filled with display elements. In one form, the display elements may comprise an electrophoretic particle system using particles of one color and a colored fluid or an electrophoretic two particle system. As above, this exemplary woven layer could be black in color to enhance image contrast.

As shown, the second encapsulating layer 204 may take the form of a two or three ply film. In this regard, a first ply may be formed of a low melt polymer layer 260. The second ply may be formed from a low permeability polymer film or layer 262. As an option, a third ply, or sub-layer, may comprise a material that is both electrically conductive and transmits visual light. This conductive ply, or sub-layer, 264 could be uniformly coated and etched, as appropriate. As will be understood, the layer 264 may have formed thereon individual islands of conductive coating to individually or collectively address display elements housed within micro-cells (through, for example, external wand-type printers and the like) or may be an anisotropic material. The third layer may or may not provide one side of an electric field, but should, in some forms, provide a low permeability barrier and an adhesive/sealing layer.

As noted above, the three layers could be joined by heat sealing. In one form as illustrated, an adhesive in the first and second encapsulating layers could be used to form a structural bond and seal the micro-cells formed by the mesh material in the middle, or encapsulated, layer. Thus, individual micro-cells would be formed. The border could be formed by heat sealing the outer two encapsulating layers together. Again, this would ensure no loss or contamination of the electrophoretic material dispersed in each micro cell.

As illustrated in FIGS. 3 and 4, sheathed fibers are woven into a mesh material. As described herein, this mesh material and a suitable imaging media (e.g. the display elements 210) are sealed between two layers. e.g. plastic or polymer-based sheets.

As an alternative approach to addressing, or manipulating, each micro-cell, such as micro-cell 208, the woven material may be formed of sheathed conductive wires. In one form, the conductive wire is coated with a single polymer layer. In another form, a multi-layered polymer coating may be used to coat the conductive material that forms the wires. The multiple layers have, in one form, different melting points. That will allow for the sealing noted above to occur by melting the outer layer of polymer material. However, an insulative coating, e.g. an inner polymer layer having a higher melting point, remains intact to continue to protect the conductive portion of the wire and prevent short circuits in the matrix of wire that forms the micro-mesh material in this described embodiment.

Using conductive wires to form the micro-mesh material, an appropriate combination of voltages or currents could be applied to the wires surrounding each pixel to individually address that pixel with appropriate stimuli. Each small square area of media surrounded by four wires, e.g. the micro-cell 208, may be considered a pixel. Each pixel may then be electrically addressed by applying appropriate voltages or currents to the surrounding wires.

As an example, assume that the content of each micro-cell is a display element(s), composed of bichromal magnetic spheres, and oil. By applying an upward moving current in the wire at the left side of the pixel, a downward moving current in the wire at the right side of the pixel, a rightward moving current in the wire at the top side of the pixel, and a leftward moving current in the wire at the bottom side of the pixel, a clockwise loop of current is created around the pixel. This generates a magnetic field at the pixel pointing into the plane of FIG. 4. The bichromal magnetic dipole(s) will rotate to align with this magnetic field. If all the applied currents are reversed, the bichromal magnetic dipole(s) will flip direction. For electrophoretic or dielectrophoretic imaging media, voltages can be applied to the four wires surrounding the pixel, producing an electric field and an electric field gradient that can be used to move electrophoretic or dielectrophoretic particles in the pixel. Of course, a variety of other electrical and magnetic phenomenon may be manipulated to achieve a change in state of the display elements, depending, at least in part, on the form of the display element.

Figure 6:
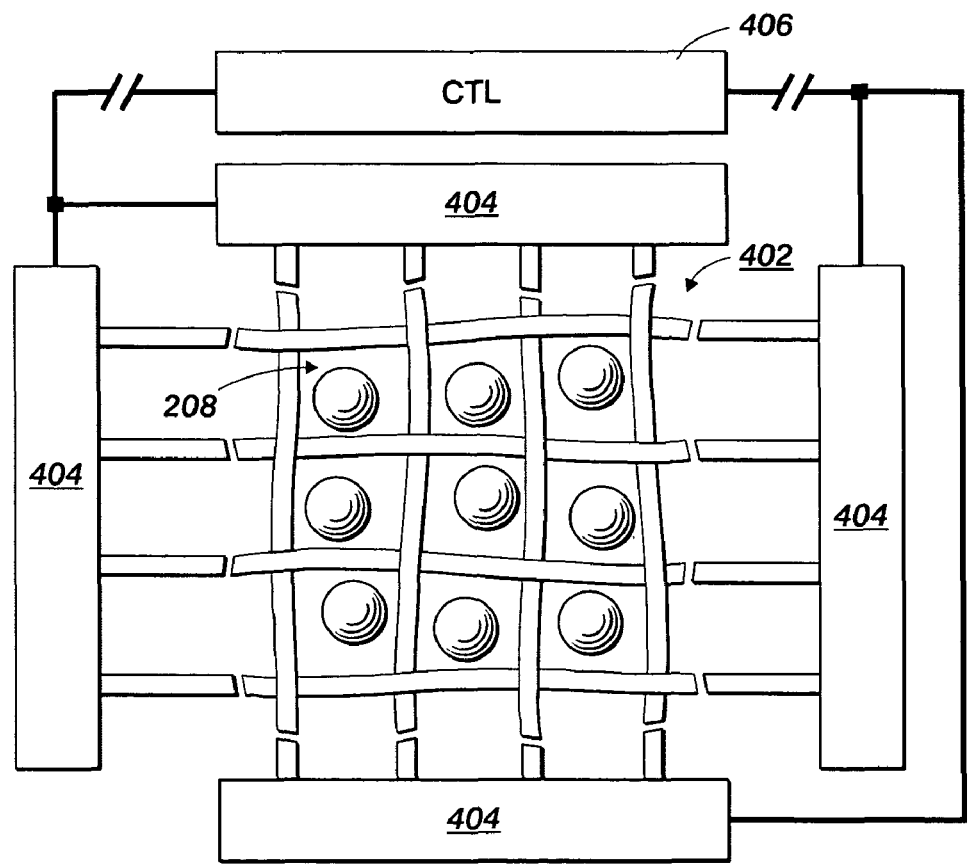

The addressing scheme for the micro-cells, and the implementation thereof, may vary, depending on the application of the presently described embodiments. However, in one form illustrated in FIG. 6, the conductive wires 400 forming the micro-mesh material 402 may simply be extended from the edges of the woven mesh to drive circuits 404 that are operative to address individual micro-cells, such as micro-cell 208, of the woven mesh matrix. The drive circuits may then be used by, for example, a print controller 406 to address the micro-cells, for example, sequentially to stimulate the display elements housed therein. The print controller 406 may be resident on the display or in a remote location, such as in a processor. Along these lines, the print controller may also be implemented using an appropriate wireless protocol. Such techniques for addressing locations in a conductive matrix, as well as others, are well known to those skilled in the art.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A flexible display apparatus comprising:
   a first flexible encapsulating layer;
   a second flexible encapsulating layer;
   a flexible encapsulated layer between the first encapsulating layer and the second encapsulating layer, the encapsulated layer comprising a mesh layer wherein a plurality of micro-cells are defined by the mesh layer, the first encapsulating layer and the second encapsulating layer; and
   a plurality of display elements housed within the plurality of microcells, wherein individual microcells of the plurality of microcells are at least partially sealed and function to house at least one display element and fluid to stimulate the at least one display element.

2. The flexible display as set forth in claim 1 wherein the first flexible encapsulating layer is heat sealable.

3. The flexible display as set forth in claim 1 wherein the first flexible encapsulating layer comprises multiple layers.

4. The flexible display as set forth in claim 1 wherein the second flexible encapsulating layer is heat sealable.

5. The flexible display as set forth in claim 1 wherein the second flexible encapsulating layer comprises multiple layers.

6. The flexible display as set forth in claim 1 wherein the second flexible encapsulating layer has conductive islands formed thereon.

7. The flexible display as set forth in claim 1 wherein the flexible encapsulated layer is heat sealable.

8. The flexible display as set forth in claim 1 wherein the flexible encapsulated layer comprises a mesh layer formed of polymer material.

9. The flexible display as set forth in claim 1 further comprising at least one drive circuit and a controller.

10. A flexible display apparatus comprising:
    a first flexible encapsulating layer;
    a second flexible encapsulating layer;
    a flexible encapsulated layer between the first encapsulating layer and the second encapsulating layer, the encapsulated layer comprising a mesh layer formed of conductive wire wherein a plurality of micro-cells are defined by the mesh layer, the first encapsulating layer and the second encapsulating layer; and
    a plurality of display elements housed within the plurality of microcells.

11. The flexible display as set forth in claim 10 wherein the conductive wire is coated with a single polymer layer.

12. The flexible display as set forth in claim 10 wherein the conductive wire is coated with multiple polymer layers.

13. The flexible display as set forth in claim 12 wherein the multiple polymer layers have different melting points.

14. The flexible display as set forth in claim 10 wherein the micro-cells of the flexible encapsulated layer are individually addressable.

15. A flexible display apparatus comprising:
a first flexible encapsulating layer;
a second flexible encapsulating layer;
a flexible encapsulated layer between the first encapsulating layer and the second encapsulating layer, the encapsulated layer comprising a conductive mesh layer wherein a plurality of micro-cells are defined by the conductive mesh layer, the first encapsulating layer and the second encapsulating layer;
a plurality of display elements housed within the plurality of microcells, wherein individual microcells of the plurality of microcells are at least partially sealed and function to house at least one display element and fluid to stimulate the at least one display element; and,
at least one drive circuit connected to the conductive mesh layer and being operative to address selected ones of the plurality of micro-cells.

16. The flexible display as set forth in claim 15 wherein the first flexible encapsulating layer is heat sealable.

17. The flexible display as set forth in claim 15 wherein the second flexible encapsulating layer is heat sealable.

18. A flexible display apparatus comprising:
a first flexible encapsulating layer;
a second flexible encapsulating layer;
a flexible encapsulated layer between the first encapsulating layer and the second encapsulating layer, the encapsulated layer comprising a conductive mesh layer formed of conductive wire wherein a plurality of micro-cells are defined by the conductive mesh layer, the first encapsulating layer and the second encapsulating layer;
a plurality of display elements housed within the plurality of microcells; and,
at least one drive circuit connected to the conductive mesh layer and being operative to address selected ones of the plurality of micro-cells.

19. The flexible display as set forth in claim 18 wherein the conductive wire is coated with multiple polymer layers.

20. The flexible display as set forth in claim 19 wherein the multiple polymer layers have different melting points.

* * * * *